(12) United States Patent
Nania

(10) Patent No.: US 9,061,725 B1
(45) Date of Patent: Jun. 23, 2015

(54) TRIKE CONVERTIBLE FOR USE AS SEAT ASSEMBLY OF A VEHICLE

(71) Applicant: Ford Global Technologies, LLC, Dearborn, MI (US)

(72) Inventor: Adrian Nania, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/293,195

(22) Filed: Jun. 2, 2014

(51) Int. Cl.
  *B62K 13/00* (2006.01)
  *B62D 61/06* (2006.01)

(52) U.S. Cl.
  CPC .............. *B62K 13/00* (2013.01); *B62D 61/065* (2013.01)

(58) Field of Classification Search
  CPC ...... B62D 61/065; B62D 61/06; B62K 13/00; B62K 13/04
  See application file for complete search history.

(56) References Cited

U.S. PATENT DOCUMENTS

| | | | |
|---|---|---|---|
| 3,111,181 A * | 11/1963 | Yatich | 180/6.5 |
| 3,666,035 A * | 5/1972 | Dudouyt | 180/210 |
| 5,372,398 A | 12/1994 | Aneiros et al. | |
| 6,416,272 B1 | 7/2002 | Suehiro et al. | |
| 6,478,104 B1 * | 11/2002 | Kemper | 180/214 |
| 6,979,013 B2 | 12/2005 | Chen | |
| 7,100,718 B2 | 9/2006 | Bancroft | |
| 7,537,237 B2 | 5/2009 | Chung et al. | |
| 2006/0054370 A1 * | 3/2006 | Sugioka et al. | 180/211 |
| 2007/0045020 A1 * | 3/2007 | Martino | 180/210 |
| 2013/0168934 A1 * | 7/2013 | Krajekian | 280/62 |

FOREIGN PATENT DOCUMENTS

| | | |
|---|---|---|
| CN | 2825435 Y | 10/2006 |
| EP | 2176117 B1 | 3/2011 |
| JP | S57201778 | 12/1982 |

* cited by examiner

*Primary Examiner* — Kevin Hurley
(74) *Attorney, Agent, or Firm* — Frank A. MacKenzie; Bejin Bieneman PLC

(57) ABSTRACT

A trike includes a bottom and a back being moveable to a deployed position for supporting a driver and a stowed position for use as a seat assembly in a vehicle. A motor connects the back and the bottom for reclining the back relative to the bottom. Two wheels support the bottom. A drive system is coupled to at least one wheel. The motor is selectively connected to the drive system for propelling the trike. As such, the motor serves the dual purpose of reclining the back relative to the bottom and propelling the trike.

20 Claims, 6 Drawing Sheets

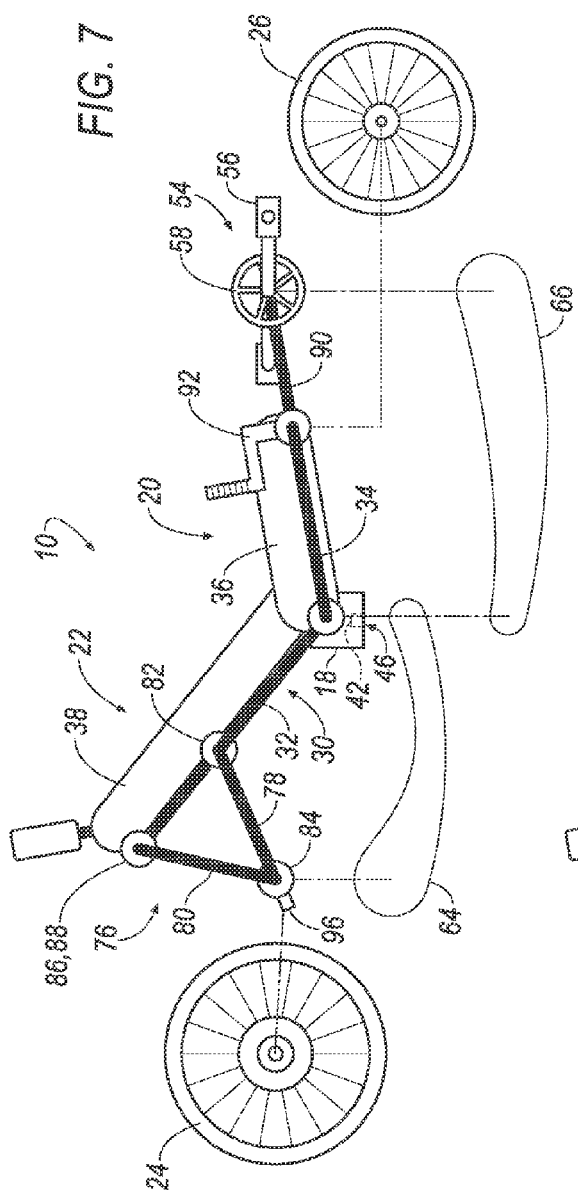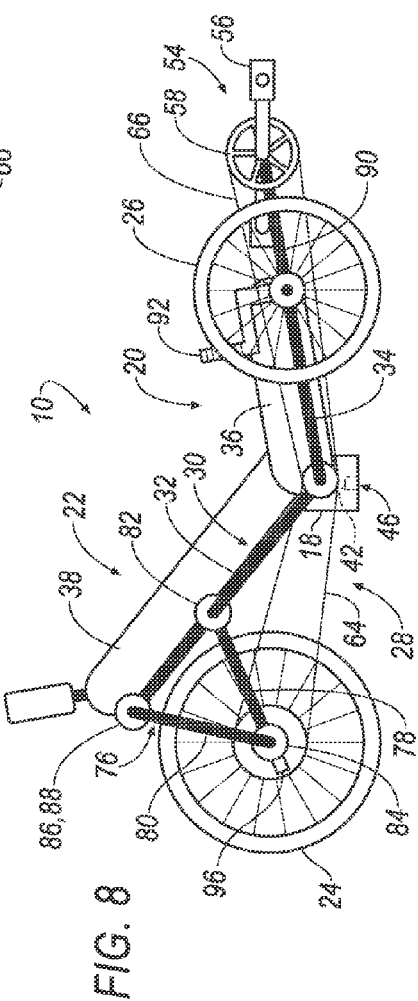

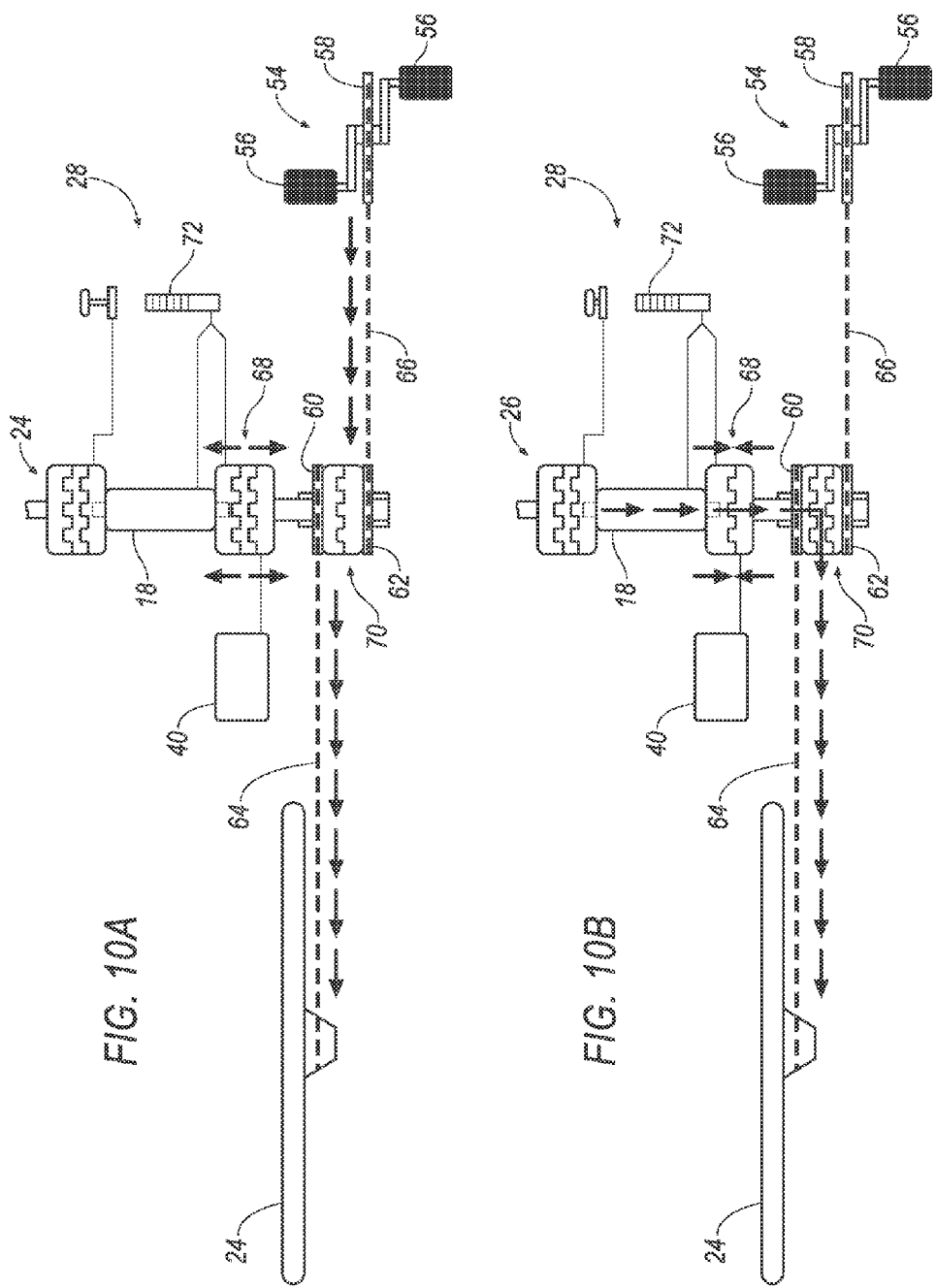

TRIKE CONVERTIBLE FOR USE AS SEAT ASSEMBLY OF A VEHICLE

BACKGROUND

A recumbent trike includes a frame extending between two front wheels and one rear wheel. The frame supports a seat bottom and a seat back. The seat bottom and the seat back are reclined such that the driver is seated in a reclined position during operation of the recumbent trike. A pedal assembly is disposed in front of the driver, generally between the two front wheels, and the driver pedals the trike while seated in the reclined position.

Recumbent trikes have several advantages in comparison with a bicycle. For example, the reclined position of the driver distributes the weight of the driver more ergonomically. For example, the reclined position may create less stress on the back, neck, and wrists of the driver. This may allow the driver to be more comfortable during operation of the recumbent trike in comparison to a bicycle. The recumbent trike is also generally more stable and is also lower to the ground such that a fall from the trike to the ground is less than that of a bicycle.

In addition to manual propulsion by pedaling, recumbent trikes may also be electric, e.g., battery powered. Accordingly, the driver may selectively pedal the recumbent trike or may ride on the trike as the trike is electrically propelled. The pedals may be used, for example, when the driver seeks exercise or when the battery is dead. The electric propulsion may be used, for example, when the driver does not want to become heated due to the exercise of pedaling. For example, a driver may use the recumbent trike with electrical propulsion when the driver is driving to work and does not want to sweat into or wrinkle the clothing of the driver.

Recumbent trikes are often transported with vehicles for use at various destinations. Packaging trikes in or on a vehicle during transportation creates difficulties, especially with relatively small vehicles. An interior of a vehicle may be reconfigurable, e.g., seats may be folded, to accommodate the trike in the interior of the vehicle. However, the trike disadvantageously consumes valuable interior space of the vehicle and can disadvantageously move within the vehicle during unexpected acceleration or deceleration.

Trikes may alternatively be stored on an exterior of a vehicle during transportation. For example, after-market racks are available for mounting to vehicles and supporting one or more trikes. However, these after-market racks are expensive to purchase. Assembly of the after-market rack to the vehicle and assembly of the trike onto the rack is also disadvantageously time consuming. The rack and the trike also disrupt airflow around the vehicle during travel, thereby disadvantageously decreasing fuel economy of the vehicle. Accordingly, there remains an opportunity to design a trike that is capable of easily and compactly stored in a vehicle.

BRIEF DESCRIPTION OF THE DRAWINGS

FIG. 7 is a is a schematic view of the trike with a seat back reclined relative to a seat bottom and with a pedal support member telescoped from a seat bottom frame and with wheels assembled to the trike;

FIG. 8 is schematic view of the trike in a deployed position;

FIG. 10A is a schematic view of a drive system of the trike in a manual position; and FIG. 10B is a schematic view of the drive system of the trike in a power driven position.

DETAILED DESCRIPTION

Figure 1:
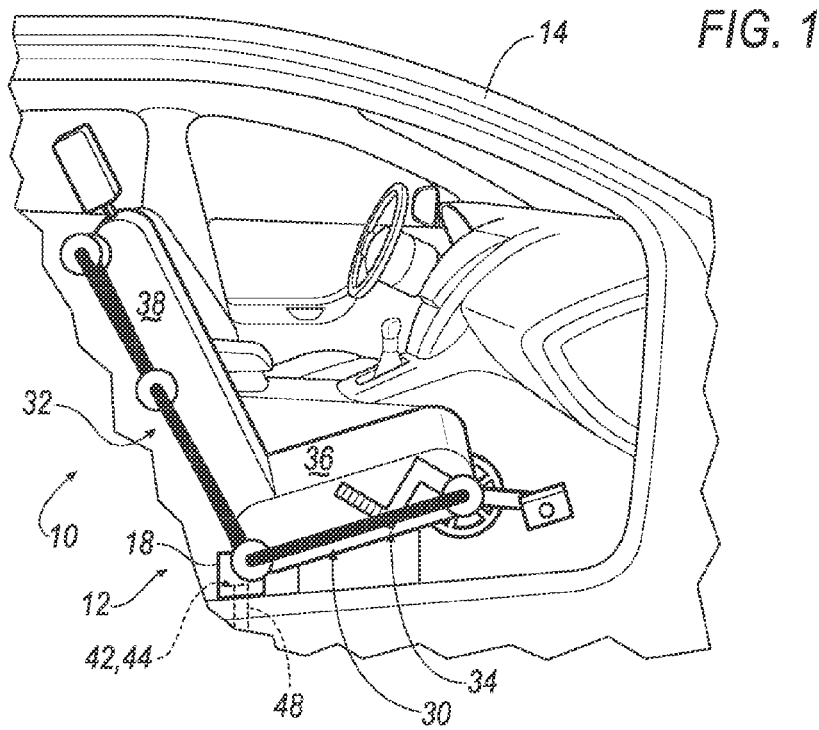
FIG. 1 is a perspective view of a trike in a stowed position for use as a front passenger seat of a vehicle.
Figure 2:
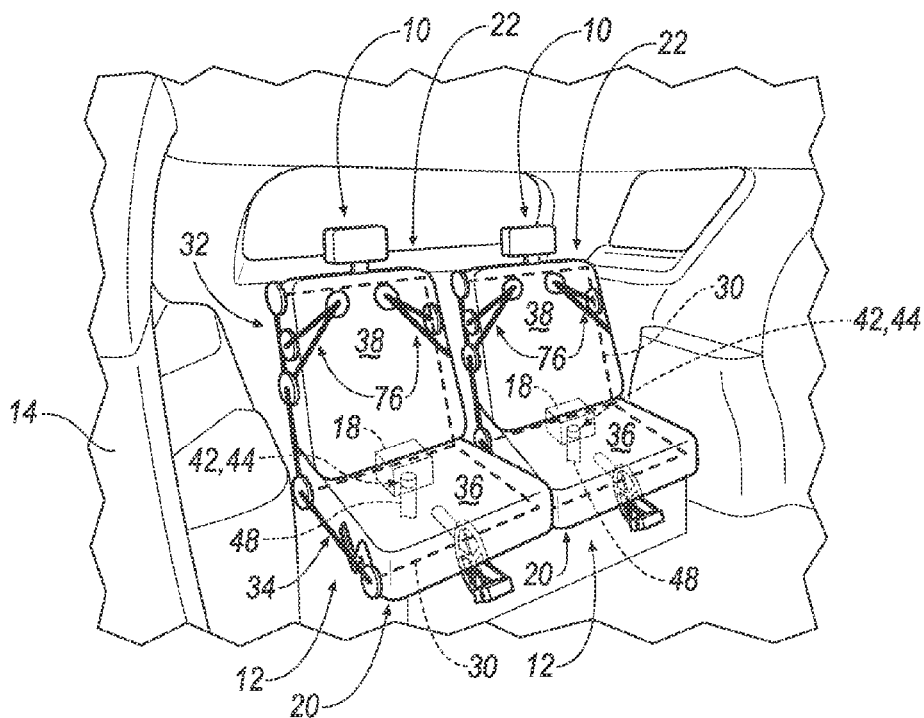
FIG. 2 is a perspective view of two trikes each in a stowed position for use as rear seats in a vehicle.
Figure 3:
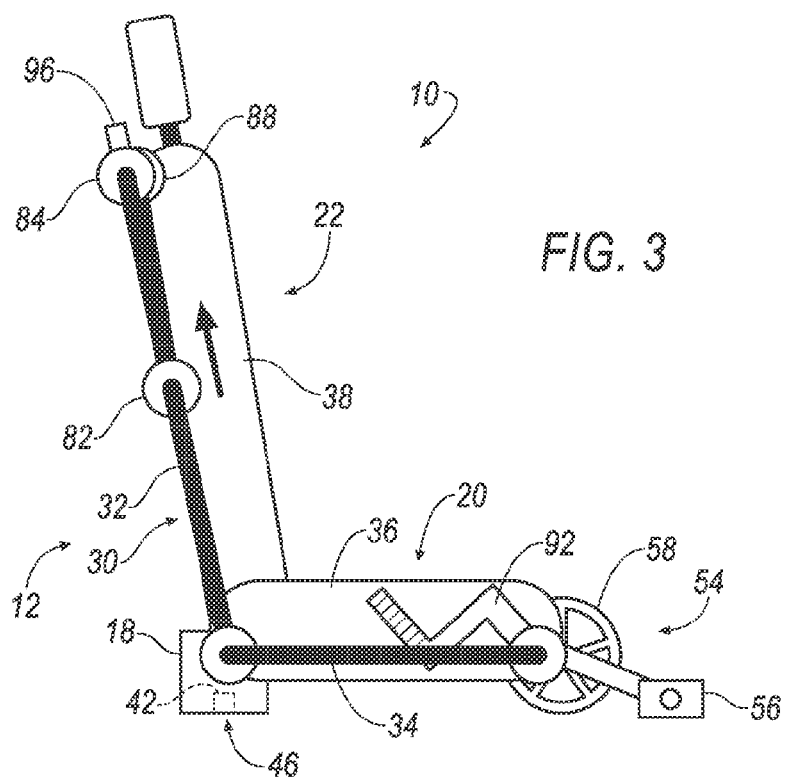
FIG. 3 is a schematic view of the trike in the stowed position and removed from the vehicle.
Figure 4:
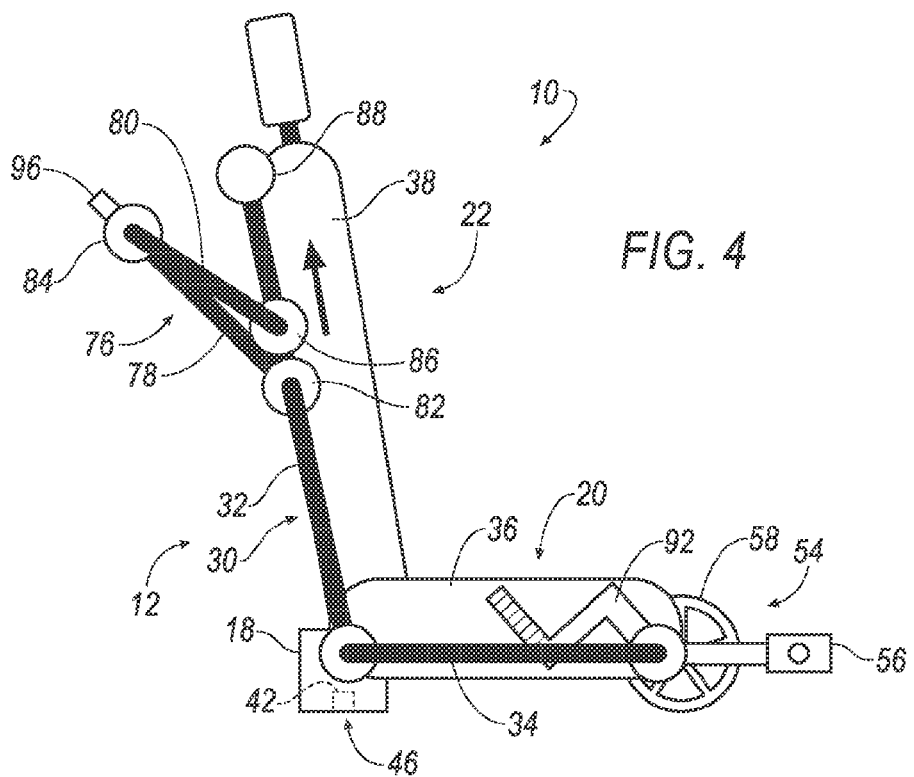
FIG. 4 is a schematic view of the trike with a fork of the frame pivoted relative to a seat back frame.
Figure 9:
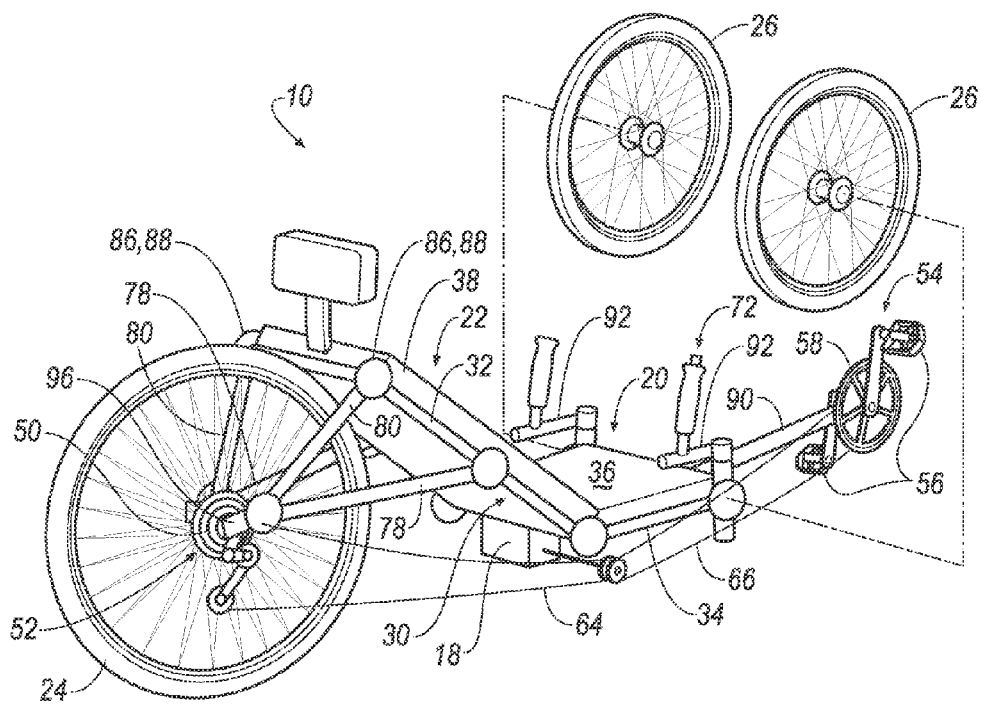
FIG. 9 is a perspective view of the trike in the position.

With reference to the Figures, wherein like numerals indicate like parts throughout the several views, an occupant support unit 10 is convertible between a seat assembly 12 for being supported in a vehicle 14, as shown in FIGS. 1 and 2, and a trike 16 for use external to the vehicle 14, as shown in FIGS. 7-9. The occupant support unit 10, i.e., whether configured as the trike 16 or the seat assembly 12, includes a bottom 20 and a back 22. The bottom 20 and the back 22 are moveable relative to each other between a deployed position for use as a trike 16 supporting a driver and a stowed position for use as the seat assembly 12 in the vehicle 14. The occupant support unit 10, i.e., whether configured as the trike 16 or the seat assembly 12, includes a motor 18 connecting the back 22 and the bottom 20 for reclining the back 22.

The occupant support unit 10, in other words, is moveable between the deployed position, for use as a trike 16, and the stowed position, for use as the seat assembly 12 of the vehicle 14, i.e., the trike 16 is convertible for use as the seat assembly 12. Since the motor 18 is connected to the back 22 and the bottom 20, the back 22 may be reclined relative to the bottom 20 to move the occupant support unit 10 to the deployed position as the trike 16, e.g., a recumbent position as shown in FIGS. 8 and 9 for example, so that the trike 16 may be driven by the driver. The back 22 may also be moved relative to the bottom 20 to move the occupant support unit 10 to the stowed position as the seat assembly 12. In the stowed position, the seat assembly 12 may be mounted in an interior of the vehicle 14, as shown in FIGS. 1 and 2, for example. When the seat assembly 12 is in the stowed position and mounted in the vehicle 14, the motor 18 may be operated to recline the back 22 relative to the bottom 20 to accomplish a position desired by the passenger of the seat assembly 12 in the vehicle 14.

With reference to FIGS. 7-9, the trike 16 includes at least two wheels that support the bottom 20, e.g., a driven wheel 24 and two passive wheels 26. A drive system 28 is coupled to at least one wheel, e.g., the driven wheel 24. When the occupant support unit 10 is configured as the trike 16, the motor 18 is selectively connected to the drive system 28 for propelling the trike 16. In other words, in such a configuration, the motor 18 may be connected to the drive system 28 to propel the trike 16 and may be disconnected from the drive system 28 such that the trike 16 may be manually propelled.

The motor 18, in other words, operates to select desired reclining position when the trike 16 is used as a seat assembly 12 in the vehicle 14, operates to move the back 22 relative to the bottom 20 between the deployed and stowed positions, and operates to propel the trike 16. The multiple use of the motor 18 reduces the cost to manufacture the trike 16 while also reducing the weight and complexity of the design of the trike 16.

The occupant support unit 10 may include a frame 30. The frame 30 may be, for example, tubing of any suitable material, such as steel or other suitable metal. The frame 30 may include features (not shown) for connecting the frame 30 to the vehicle 14 when the occupant support unit 10 is configured as the seat assembly 12.

The frame 30 may define the back 22 and the bottom 20. In particular, the back 22 may include a portion of the frame 30, e.g., a back frame 32, and the bottom 20 may include a portion of the frame 30, e.g., a bottom frame 34. The back frame 32 and the bottom frame 34 may be pivotally connected to each other. The motor 18 may engage both the back frame 32 and the bottom frame 34 for moving the back frame 32 and the bottom frame 34 to move the bottom 20 and the back 22 between the stowed position and the deployed position.

The bottom 20 may include a bottom pan 36 supported by the frame 30 and the back 22 may include a back pan 38 supported by the frame 30. The bottom pan 36 and/or the back pan 38 may include, for example, upholstery.

The occupant support unit 10 includes a battery 40 for electrically powering the drive system 28, as set forth further below. The battery 40 is in communication with the motor 18. The battery 40 is supported by the seat assembly 12. For example, the battery 40 is supported by the frame 30.

A seating system of the vehicle 14 includes the occupant support unit 10 when configured as the seat assembly 12, i.e., the trike 16 converted into the seat assembly 12. The seat assembly 12 may include an electrical connector 42. The seating system of the vehicle 14 includes a corresponding electrical connector 44 on the vehicle 14 corresponding to the electrical connector 42 on the seat assembly 12.

The electrical connector 42 on the seat assembly 12 may be, for example, on the motor 18. The electrical connector 44 on the vehicle 14 may be, for example, on a floor of the vehicle 14. One of the seat assembly 12 and the vehicle 14 may define a cavity 46 housing the respective electrical connector 42, 44 and the other of the seat assembly 12 and the vehicle 14 may define a post 48 supporting the other electrical connector 42, 44 for engaging the cavity 46 when the seat assembly 12 is mounted in the vehicle 14. For example, as shown in FIGS. 1 and 2, the seat assembly 12 defines the cavity 46 and the vehicle 14 presents the post 48. The motor 18 may, for example, may define the cavity 46.

The electrical connector 42 on the seat assembly 12 is electrically connected to the battery 40. The electrical connector on the vehicle 14 is electrically connected to a power source of the vehicle 14, e.g., a battery. As such, the battery 40 of the seat assembly 12 may be charged by the vehicle 14 through the electrical connectors 42, 44.

As set forth above, the trike 16 includes wheels 24, 26. The driven wheel 24 may be disposed at a rear of the trike 16, and two passive wheels 26 may be disposed at a front of the trike 16. The driven wheel 24 may include a gear 50, as shown in FIG. 9. For example, as shown in FIG. 9, the driven wheel includes a gear cassette 52. The wheels 24, 26 may be of any suitable type.

The drive system 28 is supported by the frame 30. The drive system 28 includes a pedal assembly 54 including pedals 56 and a pedal assembly gear 58. The pedals 56 may be moved by the driver of the trike 16 to manually power the trike 16, as set forth further below.

The drive system 28 includes a first gear 60 and a second gear 62. The first gear 60 is coupled to one of the wheels, specifically, the driven wheel 24. Specifically, a first chain 64 couples the first gear 60 to the gear of the driven wheel. The trike 16 may include a gear selection system for selecting any gear of the gear cassette 52 of the driven wheel, i.e., for moving the first chain 64 to any gear of the gear cassette 52.

A second gear 62 is coupled to the pedal assembly 54. Specifically, a second chain 66 couples the second gear 62 to the pedal assembly 54.

The occupant support unit 10 includes a first clutch 68 between the motor 18 and the drive system 28. It should be appreciated that the terms "first" and "second" with reference to the clutches is used merely used for identification and are not meant to indicate order or relevant importance.

The drive system 28 includes a second clutch 70 between the pedals 56 and the at least one wheel coupled to the drive system 28, i.e., the driven wheel 24. Specifically, the second clutch 70 is disposed between the first gear 60 and the second gear 62. The first clutch 68 and the second clutch 70 may be of any suitable type and each may be moved, independent of each other, between an engaged position to transmit torque therethrough and a disengaged position to prevent torque transmission therethrough.

The first clutch 68 and the second clutch 70 are operated to move the drive system 28 between a manual mode powered by the driver, as shown in FIG. 10A, and a powered mode powered by the motor 18, as shown in FIG. 10B. With reference to FIG. 10A, in the manual mode, the first clutch 68 is in the disengaged position to disconnect the drive system 28 from the motor 18, and the second clutch 70 is in the engaged position to transmit torque between the first gear 60 and the second gear 62. As such, as the pedals 56 are driven, the rotation of the pedal assembly gear 58 is transmitted through the second chain 66, second gear 62, first gear 60, and first chain 64 to the driven wheel 24.

With reference to FIG. 10B, in the powered mode, the first clutch 68 is in the engaged position to connect the drive system 28 to the motor 18, and the second clutch 70 is in the disengaged position to disconnect the first gear 60 and the second gear 62. In such a configuration, the motor 18 can rotate the first gear 60. The rotation of the first gear 60 drives the first chain 64 to drive the driven wheel 24. Since the second gear 62 is disconnected from the first gear 60, the motor 18 does not rotate the pedal assembly 54 in the powered mode.

The first clutch 68 and the second clutch 70 may be actuated between the engaged position and the disengaged position in any suitable way. The movements of the first clutch 68 and the second clutch 70 may be controlled by independent mechanisms or may be controlled by a common mechanism.

The actuation of the first clutch 68 and the second clutch 70 may be controlled in any suitable way. For example, the trike 16 may include a switch 72 for selecting the manual mode or the powered mode to actuate the first clutch 68 and the second clutch 70 to the appropriate engaged/disengaged position. As one example, the switch 72 may be a toggle switch. The switch 72 may be disposed, for example, on a handle of the trike 16.

The occupant support unit 10 may include a third clutch 74 between the motor 18 and the frame 30. When the occupant support unit 10 is configured as the trike 16, the third clutch 74 is in a disengaged position to prevent the motor 18 from reclining the back 22 relative to the bottom 20, as shown in FIGS. 10A and 10B. When the occupant support unit 10 is configured as the seat assembly 12 in the vehicle 14, the third clutch 74 is in an engaged position (not shown) so that the motor 18 may be selectively used to recline the back 22 relative to the bottom 20. When the occupant support unit 10 is configured as the seat assembly 12 in the vehicle 14, the first clutch 68 is in the disengaged position to prevent torque transmission from the motor 18 to the first gear 60. In the alternative to the third clutch 74, the occupant support system may include a removable pin (not shown) engaging a shaft of the motor 18 and the frame 30. In such a configuration, this removable pin may be disengaged with the motor 18 and/or the frame 30 to allow for relative rotation.

The occupant support unit 10 may include a controller (not shown) that automatically actuates the first and third clutch 74 to an appropriate position based on whether the occupant support unit 10 is connected to the vehicle 14. For example, the controller may automatically actuate the third clutch 74 to the engaged position and automatically actuate the first clutch 68 to the disengaged position when the cavity 46 receives the post 48, i.e., when the occupant support unit 10 is configured as the seat assembly 12 and assembled to the vehicle 14. In such a configuration, the controller may automatically actuate the third clutch 74 to the disengaged position and automatically actuate the first clutch 68 to the engaged position when the post 48 is removed from the cavity 46, i.e., when the occupant support unit 10 is removed from the vehicle 14. In such a configuration, the controller may automatically move the bottom 20 and the back 22 to the deployed position, i.e., to deploy the trike 16. Alternatively, an input, such as a button or other manual mechanism, may be used to actuate the first clutch 68 and the third clutch 74 when the occupant support unit 10 is engaged with/disengaged from the vehicle 14.

The motor 18 is supported by the frame 30. The motor 18 may be of any suitable type.

With reference to FIGS. 3-8, the occupant support unit 10 includes a fork 76 that is foldable relative to the frame 30 in the stowed position and the deployed position. Specifically, the occupant support unit 10 includes two forks 76. Each fork 76 includes an extension 96 configured to engage the driven wheel in the deployed position.

The fork 76 is pivotally connected to the frame 30. Each fork 76 includes a first member 78 and a second member 80. The first member 78 is pivotally coupled to the back frame 32 at a first pivot point 82. The second member 80 is pivotally coupled to the first member 78 at a second pivot point 84 spaced from the first pivot point 82.

The second member 80 includes a connection point 86 spaced from the second pivot point 84 and the back frame 32 includes a corresponding connection point 88. To connection points 86, 88 are configured to be selectively locked to each other. The connection points 86, 88 can be locked in any suitable fashion including interlocking members (not shown), fasteners (not shown), etc.

Figure 5:
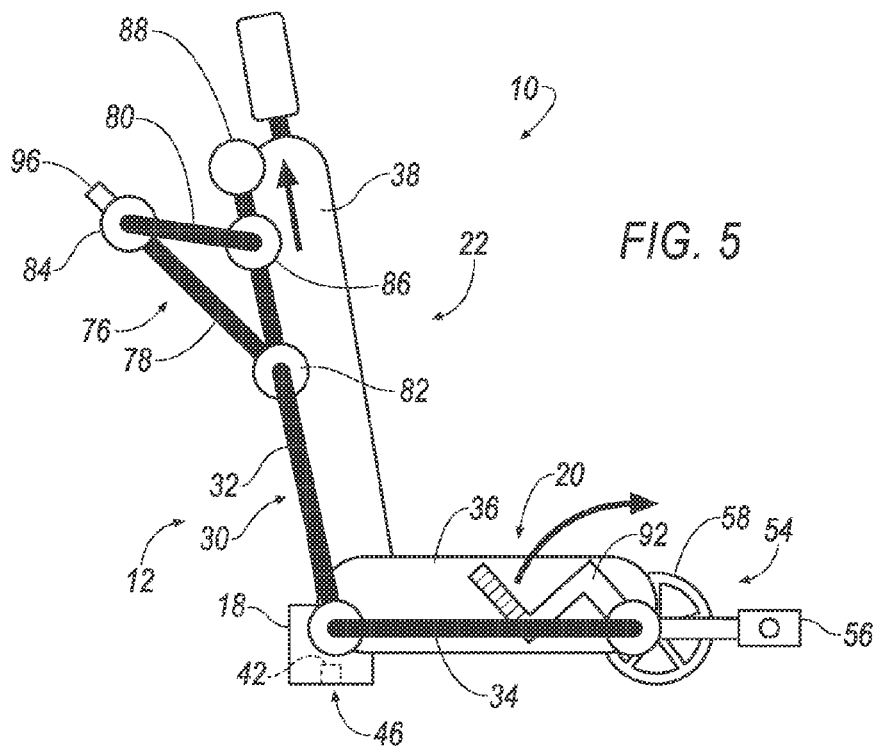
FIG. 5 is a schematic view of the trike with the fork further pivoted relative to the seat back frame.
Figure 6:
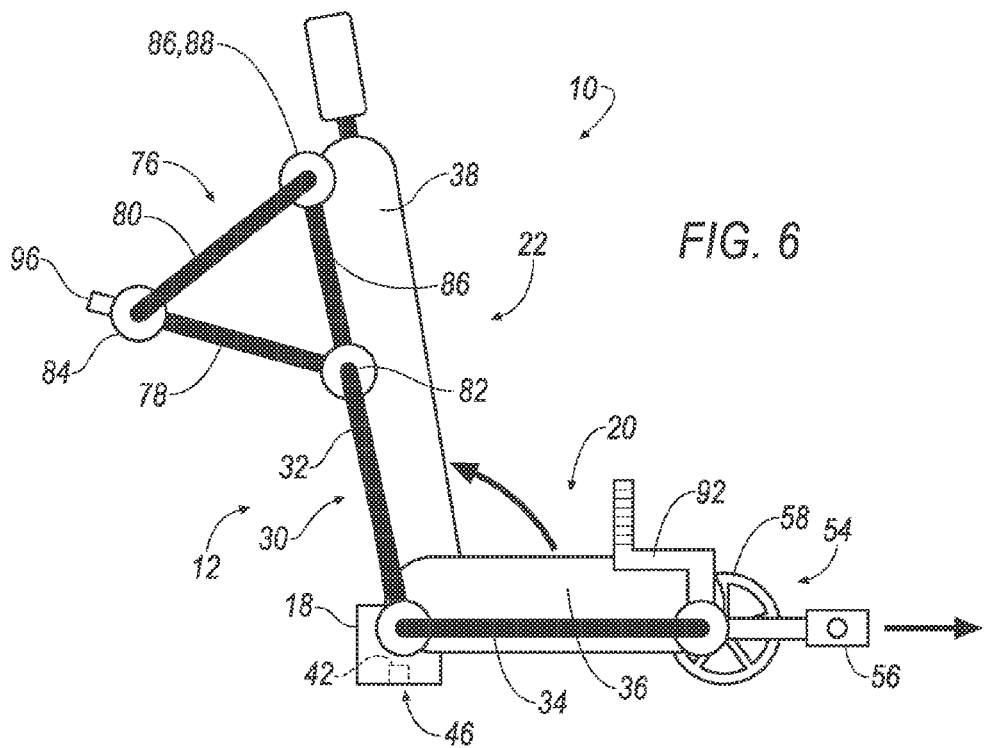
FIG. 6 is a schematic view of the trike with the fork further pivoted relative to the seat back and connected to the seat back frame at two locations and with handles deployed.

A pedal support 90 telescopically extends from the bottom frame 34. Specifically, as shown in FIGS. 5 and 6, the pedal support 90 is moveable between a retracted position, as shown in FIG. 5, and an extended position, as shown in FIG. 6. The pedal support 90 may be locked in the retracted position and the extended position in any suitable way. The pedal support 90 supports the pedal assembly 54.

The trike 16 includes handles 92 pivotally coupled to the bottom frame 34. With reference to FIGS. 5 and 6, the handles 92 may be rotated between a retracted position, as shown in FIG. 5, and an extended position, as shown in FIG. 6. The handles 92 may be coupled to the passive wheels 26 to steer the passive wheels 26. For example the handles 92 may be mechanically linked to the passive wheels 26 for steering the passive wheels 26.

The trike 16 may include an accelerator (not shown) for controlling the speed of the motor 18, and thus the speed of the trike 16, when the driving system is in the powered mode. The accelerator may be mounted, for example, on one of the handles 92. The driving system may include any suitable gear reductions between the motor 18 and the first gear 60. The trike 16 may include any suitable braking system (not shown).

In operation, the occupant support unit 10 may be configured as the seat assembly 12, as referenced above and as shown in FIGS. 1 and 2. The occupant support unit 10 may be removed from the vehicle 14 for conversion from the seat assembly 12 to the trike 16. The seat assembly 12 may be, for example, mounted to the floor of the vehicle 14 and may be engaged with and released from the floor in any suitable manner.

With reference to FIGS. 3-6, when the seat assembly 12 is removed from the vehicle 14, the forks 76 are unfolded. Specifically, the connection point of the second member 80 is moved into engagement with the connection point 88 on the back frame 32. The movement of the forks 76 may be automated, e.g., with the use of a motor 18, or may be manual.

With reference to FIGS. 5 and 6, during conversion of the occupant support unit 10 from the seat assembly 12 to the trike 16, the handles 92 are pivoted from the retracted position, shown in FIG. 5, to the extended position, shown in FIG. 6. The movement of the handles 92 may be automated, e.g., with the use of a motor 18, or may be manual.

With reference to FIGS. 6 and 7, the pedal support 90 is telescopically extended from the bottom frame 34. The extension of the pedal support 90 may be automated, e.g., with the use of a motor 18, or may be manual.

With reference to FIGS. 6 and 7, the motor 18 reclines the back 22 relative to the bottom 20. When the back 22 is reclined to the desired position, the third clutch 74 may be moved to the disengaged position to disengage the motor 18 from the back 22 so that the motor 18 may be used to power the trike 16.

Figure 11:
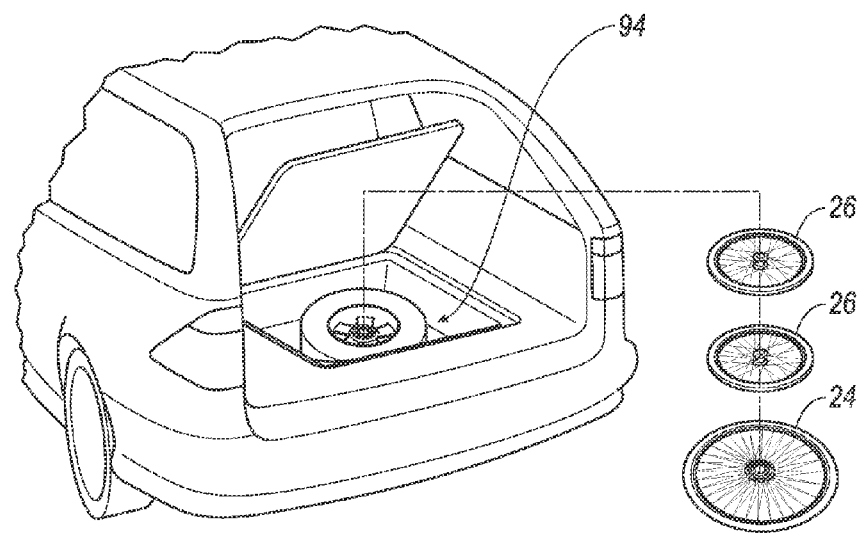
FIG. 11 is a perspective view of a vehicle with wheels of the trike stowed in the vehicle.

The wheels 24, 26 are assembled to the frame 30 of the trike 16. The wheels 24, 26 may be, for example, housed in a storage compartment 94 of the vehicle 14 when not in use, as shown in FIG. 11. The first chain 64 and the second chain 66 may be supported on the occupant support unit 10 in all configurations, i.e., when configured as the trike 16 and when configured as the seat assembly 12. The first chain 64 and/or the second chain 66 may, for example, be enclosed in a casing (not shown) that allows the first chain 64 and/or the second chain 66 to collapse with the rest of the trike 16 and not dirty the interior of the vehicle 14. Alternatively, the chains 64, 66 may be removed when the occupant support unit 10 is configured as the seat assembly 12 and assembled when configured as the trike 16.

Once converted into the trike 16, the driver may operate the trike 16 and drive to locations remote from the vehicle 14. When the occupant support unit 10 is converted into the trike 16, the trike 16 may be switched between the power driven mode and the manual mode by operation of the switch 72.

The occupant support unit 10 may be converted from the trike 16 to the seat assembly 12 by reversing the steps set forth above. Once converted into the seat assembly 12, the seat assembly 12 is loaded into the vehicle 14 and the electrical connectors are engaged.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

What is claimed is:

1. A trike comprising:
    a bottom and a back being moveable to a deployed position for supporting a driver and a stowed position for use as a seat assembly in a vehicle;
    a motor connecting the back and the bottom for reclining the back;
    two wheels supporting the bottom;
    a drive system coupled to at least one wheel; and
    the motor being selectively connected to the drive system for propelling the trike.

2. The trike as set forth in claim 1 further comprising a first clutch disposed between the motor and the drive system.

3. The trike as set forth in claim 2 further comprising a switch for engaging and disengaging the first clutch.

4. The trike as set forth in claim 2 a first gear coupled to the wheel, a second gear coupled to the pedals, and a second clutch between the first gear and the second gear.

5. The trike as set forth in claim 4 wherein the first gear is coupled to the first clutch.

6. The trike as set forth in claim 4 further comprising a first chain coupling the first gear and the wheel and a second chain coupling the second gear and the pedals.

7. The trike as set forth in claim 1 wherein the drive system includes pedals and a clutch between the pedals and the at least one wheel coupled to the drive system.

8. The trike as set forth in claim 7 wherein the clutch is between the motor and the at least one wheel coupled to the drive system.

9. The trike as set forth in claim 1 further comprising a battery in communication with the motor.

10. The trike as set forth in claim 1 further comprising an electrical connector for engaging a corresponding electrical connector on the vehicle.

11. The trike as set forth in claim 1 wherein the back includes a frame and further comprising a fork that is foldable relative to the frame in the stowed position and the deployed position.

12. The trike as set forth in claim 11 wherein the fork is pivotally connected to the frame.

13. The trike as set forth in claim 1 wherein the bottom incudes a frame and further comprising a pedal support that telescopically extends from the frame.

14. A seating system for a vehicle, the seating system comprising:
    a seat assembly moveable between a deployed position for use as a trike external to the vehicle and a stowed position for being supported in the vehicle;
    a motor supported by the seat assembly for moving between the deployed and stowed positions; and
    a drive system supported by the seat assembly, the motor being selectively connected to the drive system for propelling the trike.

15. The seating system as set forth in claim 14 further comprising a battery supported by the seat assembly and in communication with the motor.

16. The seating system as set forth in claim 15 further comprising an electrical connector supported on the seat assembly and a corresponding electrical connector for being supported by the vehicle to connect the battery to the vehicle.

17. The seating system as set forth in claim 14 further comprising a first clutch disposed between the motor and the drive system.

18. The seating system as set forth in claim 17 a first gear coupled to the wheel, a second gear coupled to the pedals, and a second clutch between the first gear and the second gear.

19. The seating system as set forth in claim 18 wherein the first gear is coupled to the first clutch.

20. The seating system as set forth in claim 14 wherein the drive system includes pedals and a clutch between the pedals and the at least one wheel coupled to the drive system.

* * * * *